United States Patent Office 2,736,090
Patented Feb. 28, 1956

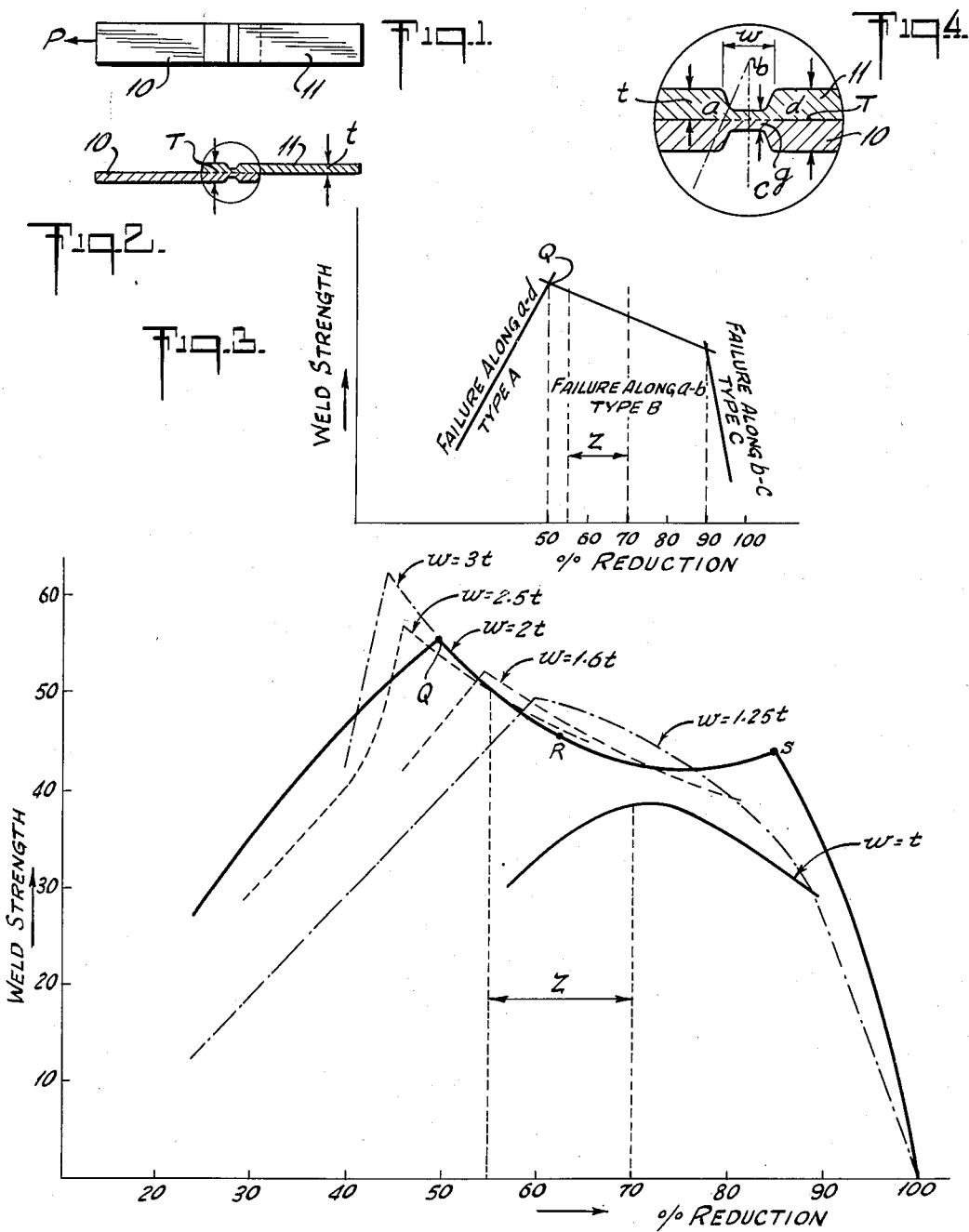

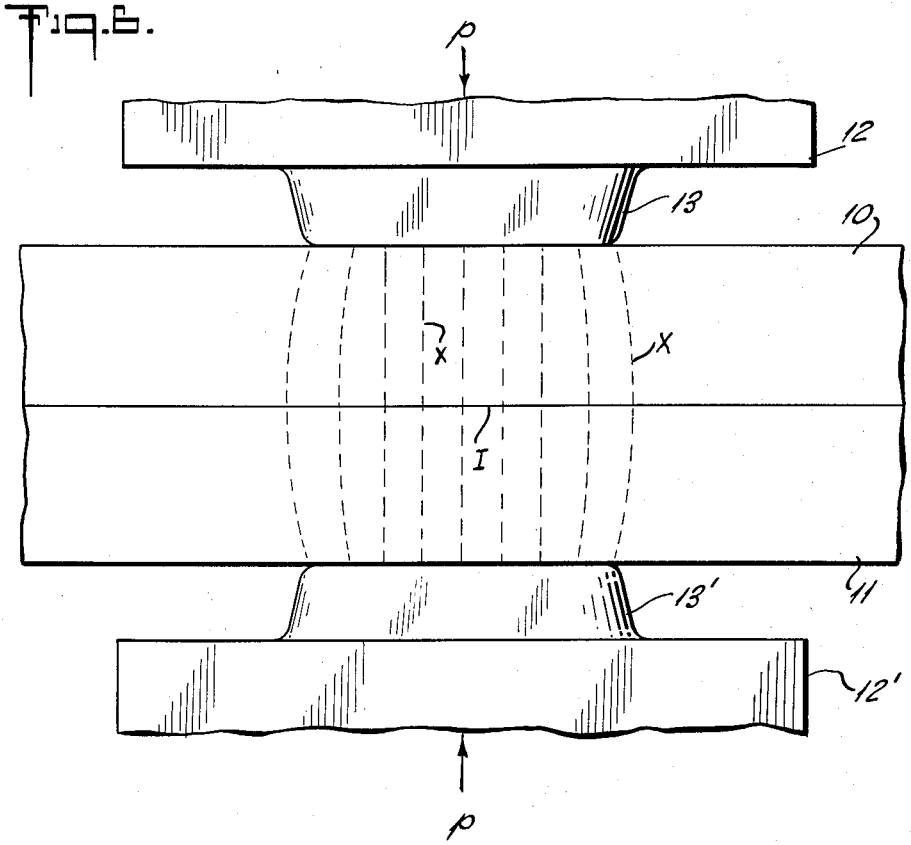
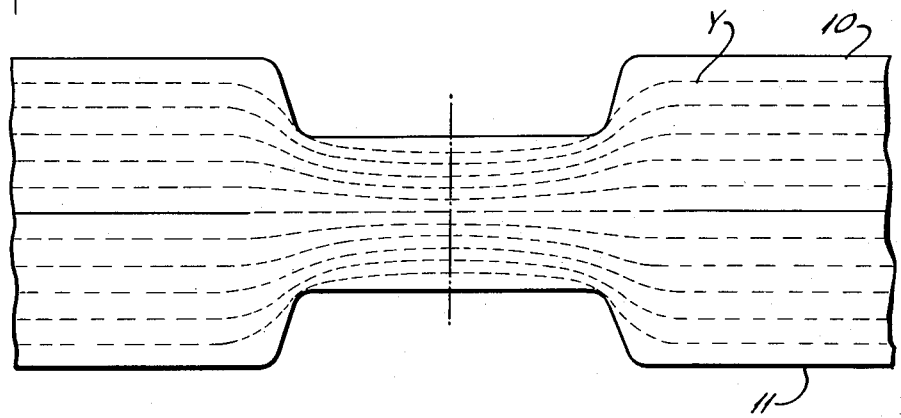

2,736,090

COLD PRESSURE WELDING

Anthony Bagnold Sowter, Ickenham, and Raymond Kenneth Hilton, West Dulwich, London, England, assignors to The General Electric Company Limited, London, England, a British company Application October 4, 1952, Serial No. 313,116

2 Claims. (Cl. 29—470.1)

The present invention relates to pressure welding, more particularly to cold pressure welding at room temperature simply by the application of local pressure to the members to be welded, to cause a preferential flow of the metals of the adjoining surfaces at the weld area and to thereby effect merging and welding thereat into an intimate solid phase welding bond.

In the U. S. Patent 2,522,408, issued September 12, 1950, there is described a method of indentation cold pressure welding using impression tools or dies of a size determined by the gauge thickness and composition of the material of the members being welded, and a tool penetration or indentation at the weld area to produce a weld of adequate mechanical strength and involving a minimum of metal displacement and resultant deformation or distortion of the members at and near the weld spot or area.

The present invention involves a further development and improvement in cold pressure welding, and more particularly an improved method of and means for producing indentation lap welds of optimum strength to insure a high degree of uniformity and consistency in the making of cold welded connections or joints, such as between plates, sheets, or like members contacting one another over an extended area, of either plain or curved shape, and where the metal flow at welding is controlled substantially by the shape and size of the impression tools or dies.

The actual physical phenomena taking place in cold pressure welding are not yet fully understood, i. e. if and to what extent any fusion occurs at discrete points of the mating surfaces with or without some recrystallization, whether welding is due to molecular or lattice diffusion or both, and other effects taking place as a result of the metal flow or displacement under the action of the impression tool or dies. Typical examples of a micro-section of an indentation cold pressure weld show that the original interface is no longer visible, while the metal flow is clearly indicated by the flow lines of the material. Flow of the metal along a relatively flat surface at the interface or stretching of the mating surfaces at the weld area are, therefore, a prime prerequisite in effecting a satisfactory cold weld joint by means of impression tools or dies.

Among the objects of the present invention is the provision of an improved cold pressure method of making indentation lap or spot welds of optimum weld strength, which can be readily and consistently made in practice, rather than fortuitously as has heretofore often happened; which provide welds of maximum strength at a minimum of die indentation or percentage reduction; and which can be used in connection with a wide range of gauge thicknesses as well as materials having different degrees of cold weldability.

Another object of the invention is the provision of an improved method of producing efficient line or seam welds composed of a series of separate spot indentation welds arranged in either single or multiple lines.

The aforementioned Patent 2,522,408, based on the initial discovery for ensuring a satisfactory spot or lap weld by cold pressure welding, states that with symmetrical tools the area of applied cold pressure (i. e. the weld area) should be rectangular in shape, with a width ($w$) of the order of the gauge thickness ($t$) of the members to be welded, and a length ($l$) of about five times the gauge thickness. When an indentation on one face of the work is to be avoided by employing a single tool in conjunction with a flat plate (herein sometimes spoken of as a single-sided tool or die), the width of the weld area is increased to 1.5 the gauge thickness. When the members to be welded are short and hard, and thus approach the limit of ductility suitable for cold pressure welding, the width of the weld area is increased to 2.5 the gauge thickness. In all cases the weld indentation (i. e. percentage reduction in total thickness of the contacting members) is about 70% for aluminum and varies for other metals according to the different Figures of Merit given in the patent.

Continued research and experience since the initial discovery has demonstrated that in the cold pressure lap welding of aluminum and equivalent cold pressure weldable metals, superior and optimum weld strength is obtained where the width of the rectangular weld area is about twice the gauge thickness, and the weld indentation is from about 55% to about 67% for aluminum. Based on these subsequent discoveries, the present invention resides in applying to the suitably cleaned and contacting surfaces of the metal members to be welded a welding pressure along a substantially rectangular weld area having a width of about twice the gauge thickness of the members and a length greater than twice its width and not exceeding about three times its width, and controlling the welding pressure to produce a reduction of from about 55% to about 67% in the total thickness of the contacting members over the weld area. With symmetrical or twin-opposed tools on opposite sides of the members, the welding pressure is preferably controlled to produce a reduction of about 55%. With a single tool and a flat plate or anvil on opposite sides of the members, the welding pressure is preferably controlled to produce a reduction of from about 65% to about 67% in the thickness of the contacting members over the weld area.

The foregoing and other novel features of the invention will be best understood from the following description taken in conjunction with the accompanying drawings, in which Figure 1 and 2 are plan and cross-sectional views, respectively, of a pair of superposed metal strips or plates welded together by a cold pressure lap weld of the type described in my aforementioned patent;

Figure 3 is a graph showing the general relation between joint failing load or weld strength of weld joints like that of Figures 1 and 2 as a function of die indentation or percentage reduction of the metal at the weld area;

Figure 4 is an enlarged cross-section of the weld joint shown in Figure 2;

Figure 5 is a graph of a number of superposed curves showing weld strength as the function of percentage reduction for various weld die widths;

Figures 6 and 7 are enlarged diagrams illustrating the method of making indentation welds prior to and after welding, respectively, and explanatory of the conditions conducive to the forming of a cold pressure weld joint according to the invention;

Like reference characters identify like parts throughout the different views of the drawings.

Figure 8:
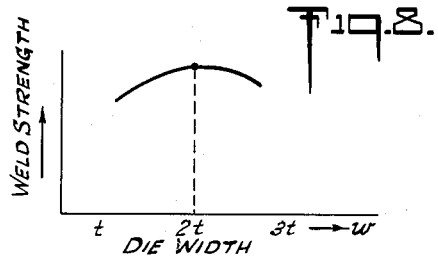
Figures 8 and 9 are further graphs showing indentation weld strength as a function of die width and length, respectively.

Indentation cold pressure welding, in common with many novel processes, has several attendant factors which at first might appear too numerous to warrant its adoption as a method of joining. However, since they are not all of equal importance, it is of interest to consider them in detail and for ease of appreciation, they have been arranged in order of importance as follows:

1. The die penetration (indentation) or movement necessary to effect a weld. This, in the case of lap welds between sheets or equivalent members of equal thickness, is expressed as the percentage reduction in the total thickness of the superposed sheets to be welded and is determined by the formula $$\left(1 - \frac{g}{T}\right) \times 100\%$$

where $g$ is the final thickness of the weld area, i. e. the distance between the dies, and $T$ or $2t$ is the total thickness of the sheets (see Figure 4).

2. Surface preparation.
3. Composition of the material.
4. The die shape. In the case of lap welding flat plates or the like, the basic shape is rectangular, either unshouldered or shouldered to limit the penetration.
5. Temperature at which the welds are made. This consideration can be omitted in cold pressure welding according to the present invention, where welding is effected substantially by pressure applied to the members to be joined, although some heat may be used to assist welding in certain cases, as long as the joining of the members is predominantly due to pressure-induced plasticity or cold flow of the metal, as distinguished from heat-induced plasticity by heating the members close to the melting point as in hammer welding or similar pressure or forge welding processes.
6. Number of dies used, i. e. (1) symmetrical or twin-opposed dies or (2) a single die and cooperating flat plate or anvil.

While this list is not comprehensive, it is considered that any omissions are relatively unimportant, and as has already been intimated, only the first four factors are critical in nature.

Before discussing the effect of each of the foregoing factors, it is desirable to describe the general welding technique and testing procedure which was adopted during the course of the investigations which form the basis of the present invention. The technique is described for a weld of a test specimen comprising two strips 10 and 11, Figures 1 and 2, of aluminum sheet of commercial purity. The intended mating surfaces were scratch-brushed after which the surfaces were placed together, care being exercised in the avoidance of contamination by finger marks. The overlapping parts were then placed between opposed welding dies and the requisite penetration effected. The joint was subsequently tested in a tensometer which, in the case of the investigation, consisted of a movable guided platen actuated by a motorized screw thread pulling one end of the specimen, as indicated at P in Figure 1, while the other end remained connected to a spring steel beam. The deflection of this beam indicated the applied load by operating a suitable dashpot and mercury column. A set of calibrated steel beams enabled accurate measurements to be made to within ±1% on the ranges 0–125 lbs., 0–250 lbs., 0–500 lbs., and 0–1 ton.

Surface preparation is next in order of importance to die penetration. However, since in many cases it is a necessary prelude to cold pressure welding it is appropriate to consider its effect in somewhat greater detail.

It has been found possible in several cases to cold pressure weld material in the same state as received from the manufacturer, but a surface preparation which disperses or removes any oxide or other contaminating surface film will greatly assist the process. Experiments have been carried out using both chemical and mechanical cleaning methods in order to find a suitable technique which would lend itself to easy commercial adoption.

The most satisfactory method consists of scratch-brushing the surfaces with a rotary brush, consisting of alloy steel wires of .004" diameter, rotated at a peripheral speed of approximately 3,000 feet per minute. The action of the scratch-brushing is to tear particles from the surface and to fling them clear, thus leaving a roughened surface of substantially pure metal and comparatively free from contaminating films. However, cleaning of the surfaces may be dispensed with in certain cases, where the applied pressure is sufficient to break up or disperse the oxide or other contaminating surface film, to enable merging or welding by cold flow of the metal.

Turning now to the die penetration factor, its purpose is to promote intimate contact over a large enough and relatively flat area to produce a lateral metal flow conducive to welding and to insure adequate mechanical strength of the weld joint.

More specifically, our investigations have shown that the relation of die penetration (percentage reduction) to weld strength, in the case of lap welds made between strips of aluminum sheet with a given die system, follows the general pattern shown by Figure 3, which has been derived from a large number of systematic tests and experiments. As the die penetration or percentage reduction increases through the range of from about zero to approximately 50%, the tendency for the mating surfaces to adhere increases and the resulting joint becomes progressively stronger. When subsequently tested to destruction, joints made in this range sever along the interface a—d of Figure 4, and for convenience they are identified as "Type A" failures. At greater die penetrations, i. e. more than 50%, "Type B" failures occur along the line a—b, indicating that in this higher range of penetration the adhesion along the initial interface is comparable in strength with that of the remaining material adjacent to the weld, the strength deteriorating as the penetration increases. Work hardening of the material in this range tends to compensate for loss of strength, until penetrations of approximately 90% are reached, after which the mode of weld failure again changes to "Type C" with severance now occurring along the line b—c. The pattern of the curve indicates that from a practical point of view, in order to insure consistency and reliability in making commercial indentation welds, it is advisable to weld with penetrations deeper than 50%, i. e. sufficiently removed from the change-over point Q from the "Class A" to the "Class B" range of weld failures, in order to insure repeated sound welds commensurate with good strength. This practical operating range is indicated at z in the drawings.

Further investigations have been made to ascertain the effect of die width, and a series of curves are plotted in Figure 5 showing the relation of die penetration (percentage reduction) to weld strength for six different die widths ($w$) varying from the metal gauge thickness ($t$) to three times the gauge thickness ($3t$). It can be seen from these curves that, as the die width is increased, the maximum possible value of the tensile strength increases and that the maximum tensile strength occurs at a lower percentage reduction.

It can be further seen from Figure 5 that, in the region of class B failures, the curves for all of the dies follow approximately the same line, the main difference being that for the wider dies the transition from "Class A" to "Class B" failure (point Q) occurs at a lower percentage reduction value. This appears reasonable, since die width obviously has a profound effect upon the interface, and where this is the weakest link it will show accordingly on the curve.

On the other hand, die width will have but little effect upon the maximum cross-sectional area subjected to tension, although it will modify slightly the effects due both to the corners of the indentation and to the cold working of the metal. These two secondary effects may explain the differences between the curves in the "Class B" range.

Within certain limits, the chief effect of increasing die width is to enlarge the welded area. Consequently, the shear strength at the interface is increased. When the very wide dies of ($w=2.5t$) and ($w=3t$) are used, however, in general this seems no longer to hold good because the strength declines rapidly below 43% reduction; so rapidly, in fact, that in practice the use of such wide dies at their optimum reduction would be too dangerous unless the penetration could be very accurately controlled. Actually, we have found that sound and consistent welds with a die width $w$ from about $3t$ and upwards can be made only by a substantial heating of the metal, a method being outside the scope of this invention.

From the evidence obtained in the course of the present investigation, bearing in mind the limitations of the narrow test specimens of commercially pure aluminum strip, it can be said that theoretrically the maximum strength obtainable from a cold pressure welded transverse tension joint, using rectangular dies, is 62.5% of the strip strength. This is obtained with a wide die that is about three times the gauge thickness of the metal, at 42% reduction.

For practical purposes, however, it can be asserted that the most useful die width for the common commercial grades of aluminum is approximately twice the single metal or gauge thickness. The peak efficiency is then 55% at about 50% reduction, but if the reduction is increased to say 55%, an efficiency of 50% can be obtained with very good consistency. Moreover, welds made under these conditions have also very satisfactory tearing strengths.

The practical upper limits of the reduction between 55% and 70% is furthermore predicated upon the fact that, although the weld strength for $w=2t$ according to Figure 5 remains substantially constant up to about 90% reduction, any unnecessary increase of the reduction will result in a corresponding increase of deformation which it is desirable to limit to a minimum.

More specifically, the deviation of the section of type B failures of the curve for $w=2t$ in Figure 5 from the theoretical linear declining shape according to Figure 3 is due to the work or strain hardening of the metal which increases in proportion to the percentage reduction or applied pressure. While this strain hardening is beneficial to a certain extent in compensating in part for the decrease in strength of the weld joint due to the reduction of the material, excessive work or strain hardening is harmful by creating abrupt internal stresses at the region of transition from the hardened material of the weld joint proper to the adjoining relatively soft or non-hardened material. This may result in a weakening or disruption of the joint due to fatigue effect and other causes. For this and other reasons, it is desirable to limit the amount of work or strain hardening to a minimum or to use a percentage reduction or applied pressure not exceeding the values required to effect efficient and reliable cold pressure welding.

It will be evident, therefore, from Figure 5 that the range of die indentations in order to insure consistent results and welds of adequate strength, lie practically between about 55% and 70% for commercially pure aluminum, with the die width varying in inverse ratio therewith from about one to twice the gauge thickness. A die width of less than the gauge thickness $t$, besides involving more or less erratic welding conditions, will reduce the weld strength to such an extent as to make a joint useless for any practical purpose. The curves for these limiting values of the die width (i. e. $w=t$ and $w=2t$) are shown in heavy lines in Figure 5, while the practical operating range is indicated by $z$, with the lower value applying more particularly to double-sided welds made with twin-opposed dies and the higher value applying more particularly to single-sided welds made with a single tool and cooperating plate.

From the foregoing it is seen that the curve for $w=2t$, Fig. 5, represents a continuous and consistent relation between joint strength and indenting depth or metal reduction at the weld, being divided into well-defined operating regions, that is, a first region of relatively rapidly increasing strength as a function of increasing percentage reduction up to a point Q of peak strength, this region being characterized by a substantially adhesive joint between the members, that is, a joint characterized by a Type-A joint failure and which gradually changes into a true weld joint at the point Q. This first region is followed by a region of true welding Q—S characterized by a Type-B joint failure within which the weld strength decreases gradually as a result of the increased metal reduction, this decrease being at first substantially linear within a first portion Q—R and thereafter becoming increasingly less during the second portion R—S of the region Q—S of true welding, as a result of the increasing work-hardening effect as the tools penetrate deeper and deeper into the metal. According to the present invention, welding by double-sided indentations, that is, using twin-opposed dies, is effected at a point within the portion Q—R of the true welding region, that is, under conditions sufficiently removed from both the changeover point Q of the curve and from the portion R—S involving substantial work-hardening. This insures consistent welds of optimum strength including both tensile and shear strength as well as fatigue strength due to the absence of any substantial work-hardening of the weld metal.

More specifically, the lower limit of the die width ($w=t$) and the corresponding minimum percentage reduction of about 70%, as described and claimed in my aforementioned patent, involve a minimum of metal displacement, as a result of the use of the smallest practical die width, and thus, in turn, produce a minimum of distortion or deformation of the members at and near the weld area. This technique, therefore, is advantageously adopted where the appearance of the weld joint or a minimum of distortion or both, are of prime importance. Where maximum mechanical strength is required, on the other hand, and where appearance and distortion are of secondary concern only, the die width should be about the upper limit of the practical operating range, i. e. $w=2t$.

The effect of the die width and the significance of the upper and lower practical limits thereof will be further understood by reference to Figures 6 and 7 which show on an enlarged scale the arrangement of a twin-opposed die system for making indentation welds according to the invention.

Figure 6 shows a pair of plates or other members 10 and 11 to be welded and a pair of twin-opposed tools 12 and 12' having flat end surfaces and projecting therefrom slightly tapering and opposed impression welding tips or dies 13 and 13', respectively, terminating in rectangular pressure applying surfaces, the tools being shown engaging the plates just prior to welding. Figure 7 shows a cross-section through a completed weld. As seen from Figure 6, with the twin-opposed welding dies 13 and 13' having extended and substantially flat pressure applying surfaces, the pressure field will be uniform over an extended area, as indicated by the lines of force $x$ which are substantially at right angle to the pressure area or die faces 13 and 13'. Only near the edges does any deviation occur from the uniform field due to the curvature of the pressure lines, as indicated in the drawing.

With the metal flow or displacement being substantially laterally or at right angle to the lines of pressure, there will result a sufficient metal flow along the interface I of the members 10 and 11 or under the die faces, conducive to intimate merging and pressure welding thereat. Considered in a different manner, the metal on opposite sides of the mating surfaces at the interface I and opposite to the die faces will be sufficiently stretched in the direction of the interface so as to result in mutual interengagement of the metal grains and thereby form a solid phase welding bond by the applied pressure. Experiments have shown conclusively that a metal flow along a substantially flat mating surface or interface of adequate width or extension is a prerequisite for making a satisfactory cold weld of the type under consideration. Thus, using dies with a more or less curved pressure-applying surface, more specifically a surface having a radius of curvature which is less than about three times the metal gauge thickness, will result in excess metal flow in the direction of the applied pressure or away from the mating surfaces or interface, thereby impeding or completely preventing merging or welding of the surfaces.

The pressure field shown in Figure 6 also explains the aforementioned upper and lower limits of the die width, to insure satisfactory and consistent welds. Thus, assuming a die width of less than the gauge thickness, it will be seen that the uniform portion of the pressure field is considerably reduced, thus not only resulting in a reduction of weld strength, due to the reduced weld area, but reducing the uniformity of the pressure field at right angle to the die faces and, in turn, the metal flow along the interface, conducive to cold welding.

In effecting a pressure weld of the above type, further consideration has to be given to the resistance offered to the flow or displacement of the metal laterally at different points from under the die face or weld area. This resistance will be greatest for the metal flowing from the center and will be a minimum for the metal at the edges of the die face or weld area. Up to die widths equal to about twice the gauge thickness, that is, the upper limit of the practical operating range as hereinbefore described, the different resistance to the metal flow is practically negligible, thus insuring a ready and favorable displacement or flow of the metal along the interface and efficient and consistent welding. For die widths beyond the upper limit ($w=2t$), this difference becomes more and more important and is one of the reasons for the erratic conditions encountered within this higher range of die widths.

The final cross-section of the weld is shown more clearly in Figure 7, wherein the dotted lines $y$ indicate the flow of the metal, being clearly visible on photomicrographic cross-section.

Figure 9:
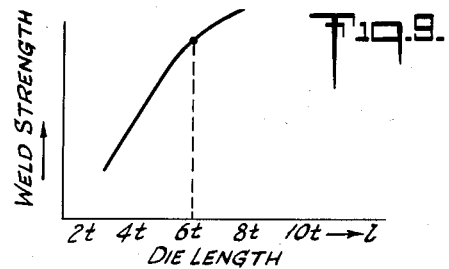

The aforementioned conditions and considerations which generally apply to the various gauge thicknesses of aluminum, as well as to other equivalent cold weldable metals, are further evidenced by the graphs derived from a series of experiments and shown in Figures 8 and 9.

Figure 8 is a graph obtained by plotting optimum weld strength as a function of die width, showing that a weld of rectangular shape becomes stronger as the die width is increased. The benefit is not so marked after a die width of twice the gauge thickness has been reached and a deeper die penetration becomes necessary to effect a true weld. The curve connecting the optimum weld strength points is seen to be concave downwards. This shows that there is an optimum value of die width which is seen to be approximately twice the gauge thickness. The weld strength decreases as the die width is either decreased or increased and eventually leads to extremely erratic welding conditions. Tests made with various guage thicknesses have confirmed the general suitability of dies of a width of about twice the gauge thickness, where maximum weld strength compatible with high consistency and uniformity of the welds are desirable.

Furthermore, as the length of a die of constant optimum width ($w=2t$) is increased, the increase in the weld strength increases, as illustrated in Figure 9. The latter indicates that directly proportional increases in weld strength are obtained as the die length is increased to about a value of $6t$. After this value, the curve departs from a linear law and the benefit derived is insufficient to justify any further increase in length. A die length of about $6t$ is therefore regarded as most suitable in order to preserve uniformity over a wide range of gauge thicknesses.

Figure 10:
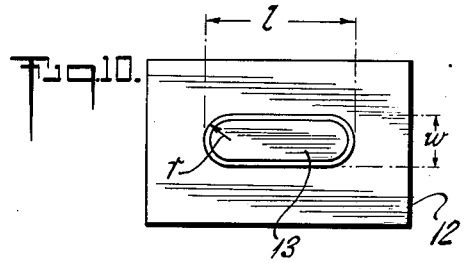
Figure 10 is a bottom view and Figure 11 is a side view, respectively, of a shouldered welding die tool constructed in accordance with the invention.
Figure 11:
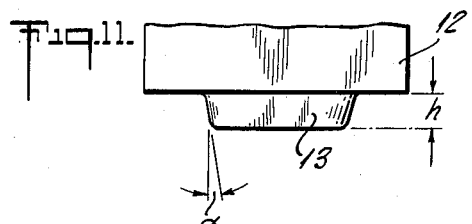

Figures 10 and 11 show a shouldered welding tool 12 constructed in accordance with the invention and having a tip or welding die 13 of a width of about twice the gauge thickness ($2t$) and a length of about three times the width ($6t$). The height $h$ of the welding die 13, which determines the percentage reduction or die penetration, is from about 55% to about 67% of the combined thickness of the two superposed members to be welded. With symmetrical tools on opposite sides of the members, it is preferable that this height $h$ be nearer the lower end of this range, say about 55 to about 60%, while with a single tool and a flat plate it is preferable that this height $h$ be nearer the upper end of the range, say 65 to 67%. The side and end walls of the welding die 13 are inwardly tapered at an angle ($\alpha$) of about 7.5 degrees. The ends of the rectangular welding die are suitably curved or rounded to prevent any abrupt internal strain or weak points and to reduce or eliminate fatigue effects. For this purpose it has been found that when the ends of the welding die are curved on a radius ($r$) of about the gauge thickness of the members to be welded consistent and satisfactory results are obtained.

At this stage it is of interest to consider the requisite die penetration to effect a weld, both from the point of view of gauge thickness and also whether (1) a symmetrical or twin-opposed die or (2) a single-sided die and cooperating flat plate is to be used. From the commercial point of view, manufacturers prefer a single-sided shouldered tool in view of the final appearance of the weld, but since the shouldered construction has the effect of restricting the flow of metal from the interface and single-sided welds have an inherently lower strength than double-sided welds, it is necessary with the former to increase the penetration slightly. This, coupled with the necessary allowance for slight deviations from the mean during production, has led to the advocation of a 67% penetration for a single-sided weld having a width of $2t$ and a length of $6t$.

Figure 12:
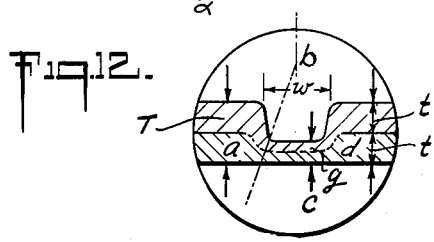
Figure 12 is similar to Figure 4, being a cross-section of a single-sided indentation weld.

Comparative tests have shown that twin-opposed dies promote stronger welds than the single-sided dies. This is to be expected since the reduced section $a$—$b$, Figure 12, of the metal sheet adjacent to the single-sided weld is only approximately half the thickness of the similar section adjacent to a double-sided weld at the same penetration, Figure 4.

More specifically, it is of interest to compare the strength of individual welds of similarly shaped indentation, when made either with a single-sided die or twin-opposed dies. When the results of the tests obtained with a die width of twice the gauge thickness are compared, it is seen that with the case of twin-opposed dies, welds are obtained which are 10% to 15% stronger than with the single-sided die.

While the invention is herein described with special reference to the common commercial grades of aluminum, for which it is especially applicable, the principles of the invention are equally applicable to other metals whose cold pressure weldability is substantially equivalent to that of aluminum. In the appended method claims aluminum is accordingly to be understood as representative of any equivalent cold pressure weldable metal.

We claim:

1. A method of producing a cold pressure spot weld between two superposed metallic members of pressure weldable material comprising applying, without the use of external welding heat, indenting pressure to opposed rectangular welding areas of said members having a width substantially greater than one and a half times the thickness of the individual members, such that the characteristics of the strength of the joint as a function of increasing indentation increases at first relatively rapidly to a point of peak strength (Q, Fig. 5) within a region characterized by a change from a substantially adhesive joint between the members to a full and true weld at said peak strength point and that, with continued increasing indentation, the strength of the joint decreases gradually within a region (Q—S, Fig. 5) of true welding of the members at first substantially linearly within the first portion (Q—R, Fig. 5) of said true welding region and thereafter at an increasingly lesser rate within the subsequent portion (R—S, Fig. 5) of said true welding region as a result of work-hardening, and controlling the pressure applied to said members to cause indentations at said areas and effect welding thereat at a point within said first portion (Q—R, Fig. 5) of said true welding region sufficiently beyond said peak strength point (Q, Fig. 5) to insure welds of consistent maximum strength and substantially free from the effects of work-hardening of the weld metal.

2. A method of producing a cold pressure spot weld between two superposed aluminum members as claimed in claim 1, wherein the width of said welding areas is about twice the gauge thickness of said members and the indentations at said areas result in a total percentage metal reduction of substantially 55% thereat.

References Cited in the file of this patent

UNITED STATES PATENTS 2,522,408     Sowter _____ Sept. 12, 1950